Sept. 8, 1964  G. WEISHEIT  3,147,827
LIQUID-DAMPED VALVE
Filed June 8, 1962  3 Sheets-Sheet 1

Georg WEISHEIT
INVENTOR.

BY Karl J. Ross

AGENT

Sept. 8, 1964      G. WEISHEIT      3,147,827

LIQUID-DAMPED VALVE

Filed June 8, 1962      3 Sheets-Sheet 2

Georg WEISHEIT
INVENTOR.

BY Karl G. Ross

AGENT

Sept. 8, 1964    G. WEISHEIT    3,147,827
LIQUID-DAMPED VALVE

Filed June 8, 1962    3 Sheets-Sheet 3

Georg WEISHEIT
*INVENTOR.*

BY *Karl F. Ross*

AGENT 3,147,827
LIQUID-DAMPED VALVE
Georg Weisheit, Trappenbergstr. 37,
Essen-Stadtwald, Germany
Filed June 8, 1962, Ser. No. 201,210
Claims priority, application Germany, June 9, 1961,
W 30,141
11 Claims. (Cl. 188—96)

My present invention relates to liquid-damped valves and the like and, more particularly, to a device of damping the displacement occurring between relatively movable elements such as the stem and body of a control valve.

It has been known heretofore to provide control valves with electromagnetic means for relatively displacing the valve stem and body, and damping means, coupled with the stem, for controlling the rate of displacement of the latter upon, or subsequently to, energization of the electromagnetic means. In general, such electromagnetic means includes a solenoid or like coil whose magnetic force acts upon a permeable core or armature to effect relative displacement between them. The armature and the coil are secured to respective valve elements to operate the valve. A restoring spring is usually provided to counteract the electromagnetic force and urge the two elements into their initial position upon relative displacement out of this position by the electromagnetic means. Such valves are, for the most part, suitable only for two-point control (e.g. for the opening and closing of a valve), since it is almost impossible to hold the elements in an intermediate position if only a restoring spring and an electromagnetic actuator are provided.

It has been previously proposed to provide the moving element of the valve with a damping device to slow its displacement between these extreme positions and thereby to effect a continuous regulation of the valve. These damping devices were generally provided with a membrane or piston which was displaceable in a liquid-filled chamber and was secured to the moving element via the actuating rod of the damping device. In this connection it should be noted that the piston-type dampers afford a greater degree of relative displacement than the membrane-type damper whose stroke is limited by the flexibility of the membrane. The aforementioned damping devices have many disadvantages since, frequently, the valve jumps from an "open" condition into a "closed" condition or vice-versa upon actuation. While the reasons for such disadvantageous motion were not fully recognized heretofore, I believe and have demonstrated that, to a large extent, such disadvantageous operation of a valve is due to the fact that the actuating rod reciprocating within the liquid-filled cylinder carries a film of liquid out of the latter upon its withdrawal therefrom. Upon reintroduction of this portion of the rod into the chamber, air is entrained into the latter to form a compressible air cushion therein. In the event that a distinct air cushion does not form, I have found that the air emulsifies part of the oil which thus no longer has the required incompressibility so that a spring effect results.

It is an object of the present invention to provide a damping device of the aforementioned character whereby the introduction of air into the damping chamber is avoided.

It is another object of my invention to provide a control valve having a damping device for effecting continuous regulation of the valve elements between these extreme positions without the disadvantages hitherto known in valves.

These objects are attained, according to the invention, by a damping device which comprises a housing or casing connected to one of a pair of relatively movable elements and formed with a damping chamber filled with a liquid such as oil. A damping member is displaceable within this chamber and subdivides it into two compartments which are interconnected by throttle means such as an adjustable valve on the member. The actuating rod, slidably received in the housing or casing, is secured to the member and extends outwardly from the chamber into engagement with the other element so that any relative displacement of the two elements is translated into a concurrent displacement of the damping member within the chamber to force fluid through the throttle passage from one compartment into the other. The housing is provided with a further compartment surrounding the rod adjacent the damping chamber at the location at which the rod extends out of the chamber and is filled with oil so that, upon reentry of the rod into the chamber, it entrains at least a film of the liquid into the chamber. This film precludes the possibility that air can be drawn into the chamber inasmuch as it forms a liquid seal for this chamber.

Advantageously, sealing means are provided intermediate the further compartment and the main chamber so that only a thin film of the liquid is entrained upon reciprocation of the rod. Additional sealing means may be provided outwardly of the further compartment to limit the introduction of air into the latter.

According to another feature of the invention, the damping chamber, which may be a membrane or piston as previously mentioned, is provided with a rod which extends through the chamber outwardly therefrom at opposite extremities, two such further compartments being provided, one at each end of the chamber, to prevent aspiration of air or other gas into the main chamber. If the damping device is maintained in an upright position with the rod extending downwardly, it is important to ensure that the further compartment disposed below the chamber is completely filled with liquid to limit the entry of air. This may be accomplished by providing a reservoir for the liquid which is connected by a suitable channel with the further compartment for admitting the liquid thereto as this liquid is depleted by entrainment into the main chamber. Moreover, this reservoir may be formed as one of the further chambers above the main chamber. Thus, the rod will project into the upper chamber so that an oil film is entrained by it downwardly when the rod is lowered. Advantageously, the main chamber may be provided with a transverse cover plate which, with the interior walls of the damper housing or casing, also forms the upper annular compartment. The casing will then be provided with at least one closable aperture for filling the further compartment.

Still another feature of this invention resides in the design of the chamber as a hydraulic cylinder in which a damping piston is displaceable. The throttle means may then comprise a passage formed in the piston and opening on opposite sides thereof while a portion of the rod remote from the element is provided with a valve member extending into this passage for adjusting the fluid flow through this passage and, consequently, the rate of displacement of the control elements.

Preferably, the actuating rod for the damping member is secured to a linearly displaceable valve member while the housing or casing is rigidly secured to the body of the valve to be controlled by the damping device. Electromagnetic means, such as the aforementioned solenoid and armature, may be provided to displace the valve member and rod in one direction while restoring means, e.g. a spring with adjustable restoring force, is provided to counter the electromagnetic displacement and return the valve to its original condition. Generally, the armature will be secured to the movable valve element and the rod while the coil is held stationary, but it will be apparent that the coil may be shiftable with the movable valve element while the magnetic core is held stationary. Means affording a visual indication of the position of the valve elements may also be provided.

The above and other objects, features and advantages of the present invention will become more readily apparent from the following detailed description, reference being made to the accompanying drawing in which.

Figure 1:
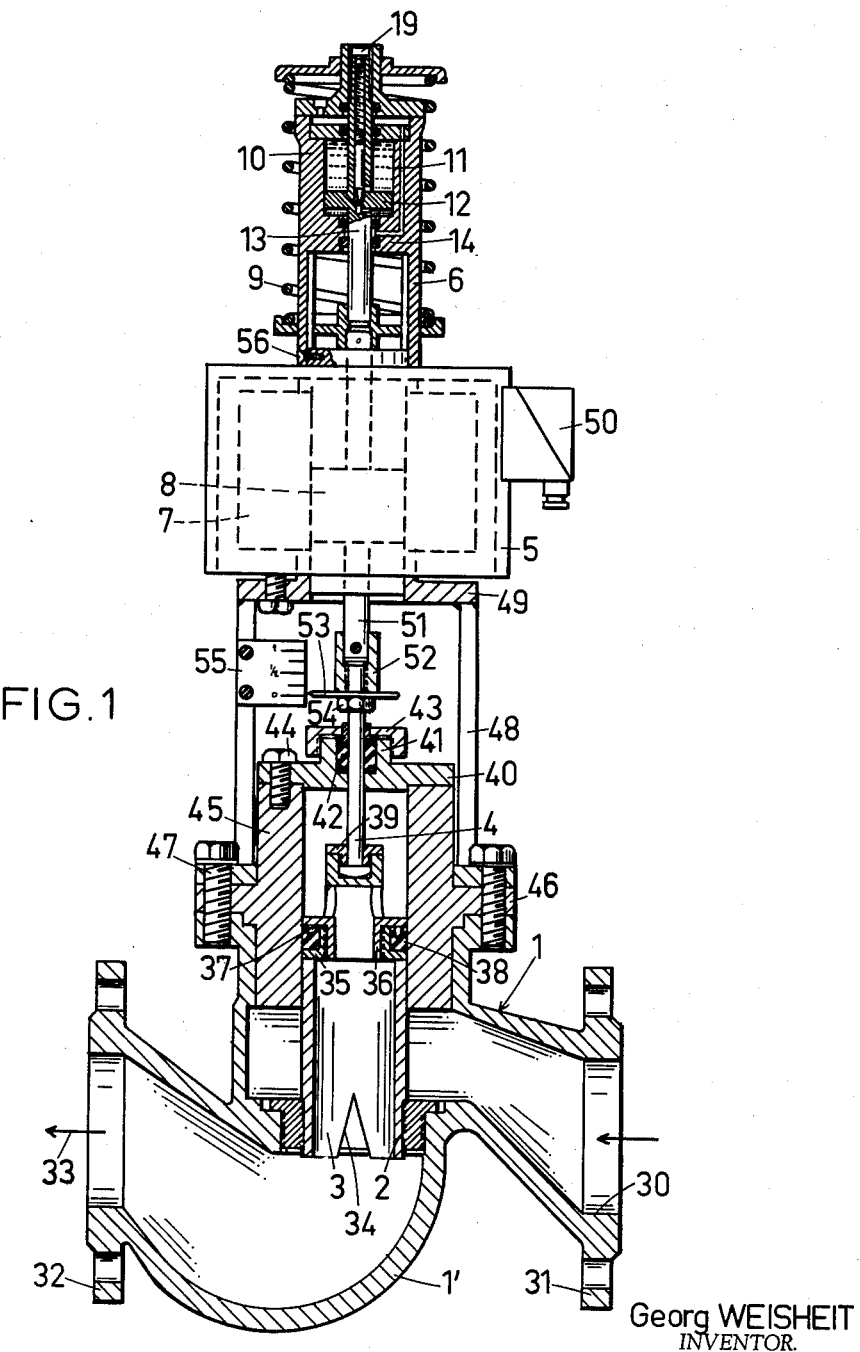
FIG. 1 is an axial cross-sectional view of a valve according to the invention.

In FIG. 1 I show a valve 1 whose body 1' is formed with the usual passageway 30 for a fluid to be controlled. The body 1' is provided with apertured flanges 31, 32 to facilitate its connection in a fluid line. Along the passageway 30 I provide a valve seat 2 which is threaded into the body so as to be removable therefrom, and a cylindrical valve member 3 which is linearly displaceable in a direction transverse to the direction of fluid flow (arrows 33). The movable valve element 3 is formed with a triangular cutout 34 through which the fluid flows when the valve element is lifted from its closed position shown in FIG. 1. Element 3 is provided with a flanged ring 35 which is threadedly received in a tubular member 36 defining with the ring 35 an annular clearance 37 for a seal 38. The valve stem 4 is joined to the tubular member member 36 by a cap nut 39 and extends through the cover plate 40 of the valve. The central aperture in this plate is surrounded by a neck 41 which encloses the packing 42, the latter being compressed by means of a packing nut 43. Bolts 44 secure the cover 40 to the neck 45 of the valve whose annular flange 46 is joined to the body 1' by bolts 47. The latter serve to secure the angularly spaced struts 48 to the valve body.

The struts 48 carry a tube 49 which forms part of the electromagnetic device 5 for actuating the valve. This device comprises a solenoid-type coil 7, wound about tube 49, to which connection is made via a connector box 50. The magnetic flux of coil 7 acts upon the armature 8 of magnetically permeable material. This armature is rigid with a bar 51 which is joined to the valve stem 4 by a threaded connector 52. This connector serves as an abutment for an indicator disk 53, held thereagainst by a nut 54, which sweeps a scale 55 providing a visual indication as to the degree of opening of the valve. Thus, in the closed position of the valve 1 the disk 53 indicates "0" while in the open condition the disk indicates "1."

Figure 2:
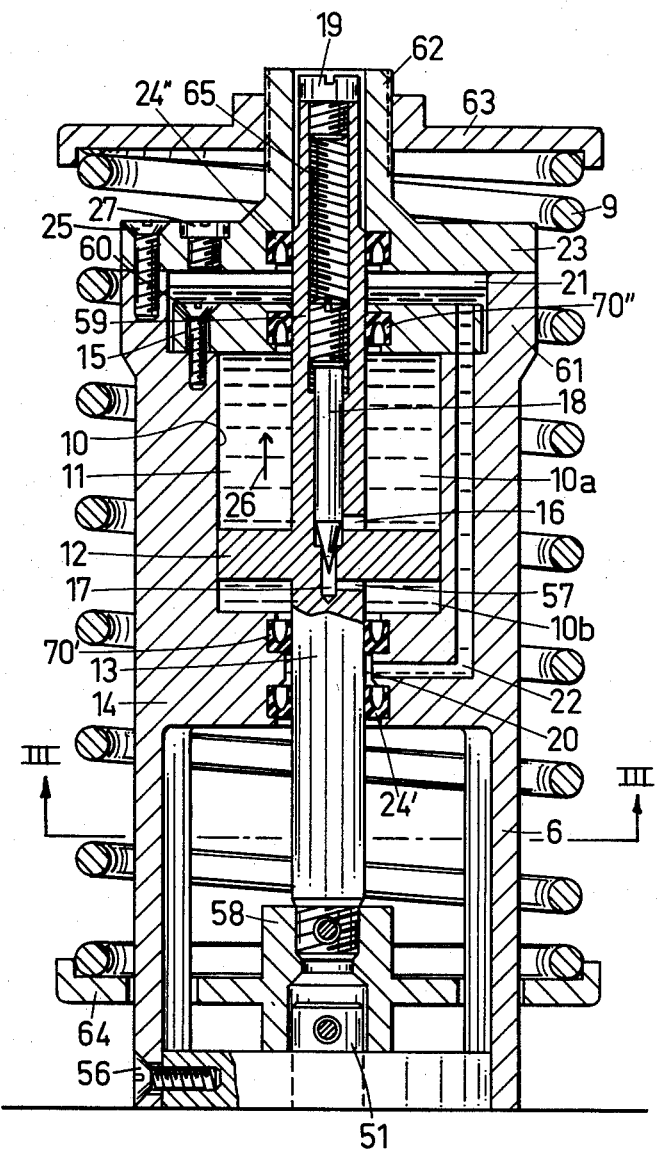
FIG. 2 is a cross-sectional detail view, drawn to enlarged scale, of the damping device of this valve.
Figure 3:
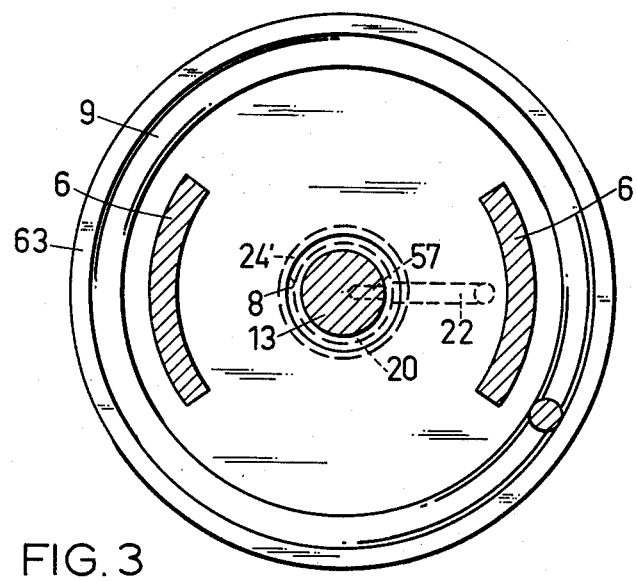
FIG. 3 is a cross-sectional view taken along the line III—III of FIG. 2.

To the electromagnetic device 5, there is secured by a screw 56 a damping device shown in greater detail in FIGS. 2 and 3. The damping device comprises a housing or casing 6 which forms a cylindrical chamber 10 filled with the damping liquid 11. A piston 12 extends transversely in the cylinder 10 and subdivides it into two compartments 10a and 10b which are interconnected by a passage 17 extending axially through the piston. This passage opens via a bore 16 into compartment 10a and another bore 57 into compartment 10b. An actuating rod 13 is rigid with the piston 12 and passes through the floor 14 of this cylinder below which it is joined to the bar 51 of the armature 8 by a coupling 58. A portion 59 of this rod extends from the piston 12 upwardly through the cover plate 15 closing the top of cylinder 10. This plate 15 is secured by bolts 60 to the casing 6 and defines with the wall 61 and cover 23 an annular chamber 21 for the liquid. This chamber may be filled via at least one aperture in the cover 23 which can be closed by a plug 27. Cover 23 is bolted by screw 25 to the casing 6.

Cover 23 also carries a threaded extension 62 upon which a disk 63 is axially displaceable to adjust the restoring force of a spring 9 bearing against this disk and against a further disk 64 integral with coupling 58. The spring biases the valve stem 4, the electromagnetic armature 8 and the rod 13 downwardly. A plug 19 closes an internally threaded axial bore 65 in the rod portion 59 through which the needle valve 18 throttling the flow of fluid through the passage 17 can be adjusted.

In the floor 14 of the cylinder 10 I provide an annular compartment 20 which surrounds the rod 13 and communicates with the upper compartment 21 via a bore or channel 22 to apply a film of the damping liquid to the rod 13 as the latter is displaced upwardly into chamber 10. This arrangement provides a liquid seal preventing the entry of air as the piston 12 is internally shifted in the direction of arrow 26 to open valve 1. When the coil 7 is de-energized, spring 9 displaces the piston 12 downwardly whereupon liquid is again entrained by the rod portion 59 into the chamber 10 from the upper compartment 21. It will be immediately apparent that this arrangement precludes the aspiration of any air or other gas into chamber 10 to form any air cushion. Throughout the axial displacement of the valve stem 4 and rod 13 by either the electromagnetic device 5 or the spring 9, its motion is controlled by virtue of the throttled flow of liquid from bore 16 through passage 17 and through bore 57 or vice-versa. Since no entrapped air exists within cylinder 10, the valve cannot jump from one condition into the other. Plug 27 permits ready refilling of the further compartments 20, 21 so that the damping device may always be maintained in an operative condition. Outwardly from the further compartments 20, 21 I provide seals 24' and 24" to limit the escape of liquid from these compartments. Further seals 70' and 70" are provided intermediate the compartments 20, 21 and the main chamber 10 to limit the amount of liquid entrained by the rod 13, 59 to a relatively thin film.

Figure 4:
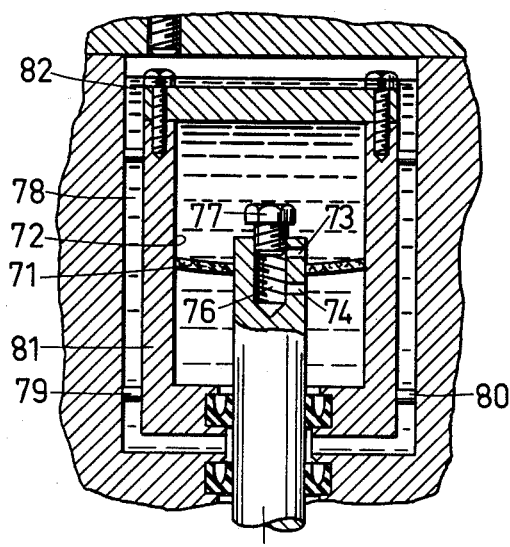
FIG. 4 is a view similar to FIG. 2 of another damping device.

In FIG. 4 I show another arrangement wherein the flexible diaphragm or membrane 71 subdivides the chamber 72 into two compartments which are connected by a pair of bores 73, 74 in an actuating rod 75 attached to the movable element of a valve, these bores being interconnected via passage 76 which is throttled by a screw 77. An annular compartment 78 for the damping liquid surrounds the chamber 72 and the rod 75. Supports 79, 80 hold the cylinder 81, enclosing the main chamber 72, in place while liquid from a reservoir 82 above chamber 72 is permitted to contact the rod 75 so that a film of liquid is entrained by the latter as previously described. The annular chamber 78 completely surrounds the main chamber 72 to effect contact between the liquid and with the rod over a large portion of its surface.

The invention as illustrated and described is believed to admit of many modifications readily apparent to persons skilled in the art but within the scope of the appended claims.

I claim:

1. In a device for damping displacement between relatively movable elements, in combination, a housing connected to one of said elements and formed with a chamber for a damping liquid, a damping member displaceably received in said chamber and subdividing it transversely into two compartments, throttle means communicating between said compartments, and an actuating rod slidably received in said housing while extending into said chamber and being operatively connected with the other of said elements, said rod being secured to said member for displacing same within said chamber upon relative displacement of said elements, said housing being formed with an annular further compartment for said liquid surrounding said rod adjacent said chamber and communicating therewith only along said rod whereby said rod entrains a film of said liquid from said further compartment into said chamber upon displacement of said rod through said further compartment toward said chamber.

2. The combination according to claim 1, wherein said rod extends through said chamber, said housing being provided with two annular further compartments for said liquid surrounding said rod adjacent said chamber at opposite extremitties thereof, both said further compartments communicating with said chamber only along said rod.

3. The combination according to claim 2, wherein said housing is provided with a channel communicating between said further compartments, and means for adding said liquid to at least one of said further compartments.

4. The combination according to claim 1, further comprising annular resilient sealing means in said housing engaging said rod intermediate said further compartment and said chamber for limiting liquid flow between said chamber and said further compartment substantially to a thin film of liquid upon said rod.

5. The combination according to claim 1, further comprising electromagnetic means for reciprocably displacing said rod.

6. The combination according to claim 1, wherein said chamber is a piston, said throttle means including a passage in said piston opening on opposite sides thereof, further comprising valve means in said rod extending into said passage for controlling the flow of liquid therethrough.

7. In a device for damping displacement between relatively movable elements, in combination,
a housing connected to one of said elements and formed with an elongated chamber for a damping liquid;
a damping member displaceably received in said chamber and subdividing it transversely into two compartments of variable volume;
throttle means on said member communicating between said compartments;
an actuating rod secured to said member and the other of said elements while being slidably received in said housing and extending into said chamber longitudinally from the exterior of said housing;
partition means in said housing forming therein a further compartment surrounding said rod and longitudinally aligned with said chamber while being interposed between said chamber and the exterior of said housing, said partition means lying between said compartment and said further chamber and permitting communication of said liquid therebetween only along said rod whereby said rod entrains a film of said liquid from said compartment into said chamber through said partition means; and an annular seal surrounding said rod and received in said partition means for restricting the thickness of the liquid film entrained by said rod, said seal having an annular channel open in the direction of said chamber and defining in said seal a pair of coaxial annular flanges biased by pressure from said chamber into annular engagement with said rod and said partition means.

8. In a device for damping displacement between relatively movable elements, in combination,
a housing connected to one of said elements and formed with an elongated chamber for a damping liquid;
a damping member displaceably received in said chamber and subdividing it transversely into two compartments of variable volume;
throttle means on said member communicating between said compartments;
an actuating rod secured to said member and the other of said elements while being slidably received in said housing and extending into said chamber longitudinally from the exterior of said housing;
partition means in said housing forming therein a further compartment surrounding said rod and longitudinally aligned with said chamber while being interposed between said chamber and the exterior of said housing, said partition means lying between said compartment and said further chamber and permitting communication of said liquid therebetween only along said rod whereby said rod entrains a film of said liquid from said compartment into said chamber through said partition means; a first annular seal surrounding said rod and received in said partition means for restricting the thickness of the liquid film entrained by said rod, said first seal having an annular channel open in the direction of said chamber and defining in said first seal a pair of coaxial annular flanges biased by pressure from said chamber into annular engagement with said rod and said partition means; and a second annular seal surrounding said rod and received in said housing intermediate said further compartment and the exterior, said second seal having an annular channel open in the direction of said further compartment and defining in said second seal a pair of coaxial annular flanges biased by pressure from said further compartment into annular engagement with said rod and said housing.

9. In a device for damping displacement between relatively movable elements, in combination,
a housing connected to one of said elements and formed with an elongated chamber for a damping liquid, said housing having a transverse annular flange coaxially outwardly of said chamber;
a damping member displaceably received in said chamber and subdividing it transversely into two compartments of variable volume;
throttle means on said member communicating between said compartments;
an actuating rod secured to said member and the other of said elements while being slidably received in said housing and extending into said chamber longitudinally from the exterior of said housing, said rod being provided with a transverse annular flange externally of said housing;
a compression coil spring coaxially surrounding said housing and bearing axially upon said flanges to urge said member toward one end of said chamber; and
partition means in said housing forming therein a further compartment surrounding said rod and longitudinally aligned with said chamber while being interposed between said chamber and the exterior of said housing, said partition means lying between said compartment and said further chamber and permitting communication of said liquid therebetween only along said rod whereby said rod entrains a film of said liquid from said compartment into said chamber through said partition means.

10. In a device for damping displacement between relatively movable elements, in combination,
a housing connected to one of said elements and formed with an elongated chamber for a damping liquid, said housing having a transverse annular flange coaxially outwardly of said chamber;
a damping member displaceably received in said chamber and subdividing it transversely into two compartments of variable volume;
throttle means on said member communicating between said compartments;
an actuating rod secured to said member and the other of said elements while being slidably received in said housing and extending into said chamber longitudinally from the exterior of said housing, said rod being provided with a transverse annular flange externally of said housing;
a compression coil spring coaxially surrounding said housing and bearing axially upon said flanges to urge said member toward one end of said chamber;
partition means in said housing forming therein a further compartment surrounding said rod and longitudinally aligned with said chamber while being interposed between said chamber and the exterior of said housing, said partition means lying between said compartment and said further chamber and permitting communication of said liquid therebetween only along said rod whereby said rod entrains a film of said liquid from said compartment into said chamber through said partition means; and an annular seal surrounding said rod and received in said partition means for restricting the thickness of the liquid film entrained by said rod, said seal having an annular channel open in the direction of said chamber and defining in said seal a pair of coaxial annular flanges biased by pressure from said chamber into annular engagement with said rod and said partition means.

11. In a device for damping displacement between relatively movable elements, in combination, a housing connected to one of said elements and formed with an elongated chamber for a damping liquid, said housing having a transverse annular flange coaxially outwardly of said chamber;

a damping member displaceably received in said chamber and subdividing it transversely into two compartments of variable volume;

throttle means on said member communicating between said compartments;

an actuating rod secured to said member and the other of said elements while being slidably received in said housing and extending into said chamber longitudinally from the exterior of said housing, said rod being provided with a transverse annular flange externally of said housing;

a compression coil spring coaxially surrounding said housing and bearing axially upon said flanges to urge said member toward one end of said chamber;

partition means in said housing forming therein a further compartment surrounding said rod and longitudinally aligned with said chamber while being interposed between said chamber and the exterior of said housing, said partition means lying between said compartment and said further chamber and permitting communication of said liquid therebetween only along said rod whereby said rod entrains a film of said liquid from said compartment into said chamber through said partition means; a first annular seal surrounding said rod and received in said partition means for restricting the thickness of the liquid film entrained by said rod, said first seal having an annular channel open in the direction of said chamber and defining in said first seal a pair of coaxial annular flanges biased by pressure from said chamber into annular engagement with said rod and said partition means; and a second annular seal surrounding said rod and received in said housing intermediate said further compartment and the exterior, said second seal having an annular channel open in the direction of said further compartment and defining in said second seal a pair of coaxial annular flanges biased by pressure from said further compartment into annular engagement with said rod and said housing.

References Cited in the file of this patent
UNITED STATES PATENTS

| | | |
|---|---|---|
| 2,334,115 | Meredith | Nov. 9, 1943 |
| 2,652,848 | Wick | Sept. 22, 1953 |